US009166427B2

(12) United States Patent
Panos

(10) Patent No.: US 9,166,427 B2
(45) Date of Patent: Oct. 20, 2015

(54) RECHARGING JACKET ASSEMBLY FOR A MOBILE COMMUNICATION DEVICE

(71) Applicant: Mipwr, LLC, Arlington Heights, IL (US)

(72) Inventor: Bobby Panos, Arlington Heights, IL (US)

(73) Assignee: Mipwr, LLC, Arlington Heights, IL (US)

( * ) Notice: Subject to any disclaimer, the term of this patent is extended or adjusted under 35 U.S.C. 154(b) by 174 days.

(21) Appl. No.: 14/087,112

(22) Filed: Nov. 22, 2013

(65) Prior Publication Data

US 2014/0152241 A1 Jun. 5, 2014

Related U.S. Application Data

(60) Provisional application No. 61/732,930, filed on Dec. 4, 2012, provisional application No. 61/786,324, filed on Mar. 15, 2013.

(51) Int. Cl.
*H02K 7/18* (2006.01)
*F03G 5/06* (2006.01)
*H02J 7/00* (2006.01)
*H02J 7/32* (2006.01)

(52) U.S. Cl.
CPC .................. *H02J 7/0042* (2013.01); *F03G 5/06* (2013.01); *H02J 7/32* (2013.01); *H02K 7/1853* (2013.01)

(58) Field of Classification Search
CPC ................................. F03G 5/06; H02J 7/0042
USPC ........................................................... 320/107
See application file for complete search history.

(56) References Cited

U.S. PATENT DOCUMENTS

| 5,644,471 | A | * | 7/1997 | Schultz et al. | ........... | 361/679.41 |
| 6,988,910 | B2 | * | 1/2006 | Gartrell | ......................... | 439/527 |
| 7,268,519 | B2 | * | 9/2007 | Simoes et al. | ................ | 320/114 |
| 8,971,039 | B2 | * | 3/2015 | Huang et al. | ............. | 361/679.56 |
| 9,011,511 | B2 | * | 4/2015 | Gregorich et al. | ........... | 623/1.11 |
| 2007/0004450 | A1 | * | 1/2007 | Parikh | ........................ | 455/556.1 |
| 2011/0159324 | A1 | * | 6/2011 | Huang et al. | ...................... | 429/7 |

* cited by examiner

*Primary Examiner* — Sun Lin
(74) *Attorney, Agent, or Firm* — Joseph M. Butscher; The Small Patent Law Group, LLC

(57) ABSTRACT

A jacket device is configured to be used with a mobile communication device. The jacket device includes a sidewall and a baseplate, wherein the sidewall and the baseplate cooperate to form a receiving chamber for receiving the mobile communication device. The jacket device also includes a rocker bar having a pressing portion connected to a rack portion, wherein the rack portion extends through the sidewall. A transmission is disposed on the baseplate and connected with the rocker bar. An electric generator is disposed on the baseplate. An electric generator includes a rotor coupled with the transmission and a stator fixed on the baseplate. When the pressing portion is pressed, the rack portion drives the rotor to rotate via the transmission so that electric power is generated by the electric generator.

16 Claims, 3 Drawing Sheets

RECHARGING JACKET ASSEMBLY FOR A MOBILE COMMUNICATION DEVICE

RELATED APPLICATIONS

The present application relates to and claims priority benefits from U.S. Provisional Patent Application No. 61/732,930, filed Dec. 4, 2012, which is hereby incorporated by reference in its entirety.

The present application also relates to and claims priority benefits from U.S. Provisional Patent Application No. 61/786,324, filed Mar. 15, 2013, which is hereby incorporated by reference in its entirety.

The present application also relates to and claims priority benefits from Chinese Patent Application No. 201320387099.6, filed Jul. 1, 2013, which is hereby incorporated by reference in its entirety.

FIELD OF THE DISCLOSURE

Embodiments of the present disclosure generally relate to communication devices, and more particularly, to a jacket device configured to be used with a mobile communication apparatus kit and a mobile communication apparatus kit including the jacket device.

BACKGROUND OF THE DISCLOSURE

Due to advancement of technologies, use of mobile communication apparatuses such as mobile phones, personal digital assistants (PDAs) and tablet computers (e.g., iPads) is increasingly widespread. Because their functions become increasingly diversified, power consumption of such mobile communication apparatuses also increases continuously. Meanwhile, as such mobile communication apparatuses are used more and more frequently, energy consumed is also increasing, and it is often the case that several backup batteries must be used every day or the battery must be recharged frequently. Furthermore, if a user staying in an environment where no recharging power source is available (e.g. a suburban area) does not carry a backup battery with him/her, then his/her mobile communication apparatus may run out of power and fail to operate any longer, which may present unnecessary troubles for the user. Also, in some emergencies, if the mobile communication apparatus runs out of power and cannot be recharged in time, unnecessary losses might be caused or the user might be put at risk.

SUMMARY OF THE DISCLOSURE

Certain embodiments of the present disclosure provide a mobile communication apparatus kit and a jacket device thereof which can solve the technical problem in the prior art that a mobile communication apparatus cannot operate when the battery runs out of power in some special circumstances. The system may include a manually operating power source for the mobile communication apparatus that can be provided in emergencies to avoid unnecessary losses and troubles.

In at least one embodiment, a jacket device for a mobile communication apparatus kit is provided. The jacket device may include a sidewall and a baseplate. The sidewall and the baseplate cooperate to form a receiving chamber for receiving a mobile communication apparatus. The jacket device may also include a rocker bar, a transmission and an electric generator. The rocker bar may include a pressing portion and a rack portion connected with each other, and the rack portion may be disposed to extend through the sidewall. The transmission may be disposed on the baseplate and may be connected with the rocker bar. The electric generator may be disposed on the baseplate and may include a rotor coupled with the transmission and a stator fixed on the baseplate. When the pressing portion is pressed, the rack portion drives the rotor to rotate via the transmission so that electric power is generated by the electric generator to be used for charging.

In at least one embodiment, the transmission is a change gear set, which may include a first gear and a second gear arranged coaxially. The first gear engages with the rack portion, and the rotor of the electric generator includes a drive gear coupled with the second gear.

In at least one embodiment, the sidewall may be formed with a through-hole and a locking portion, and the through-hole may be adapted to allow the rack portion to reciprocate therethrough. The rocker bar may be further provided with a locking structure, and the locking portion and the locking structure cooperate to fix the pressing portion into the through-hole in a non-operating status.

In at least one embodiment, an outer side surface of the pressing portion that is to be pressed by a user is flush with an outer side surface of the sidewall with a smooth transition therebetween.

In at least one embodiment, the rocker bar may also include a pivoting portion and a resilient resetting element. The pivoting portion may be connected with the baseplate. The elastic resetting element may be disposed between the pivoting portion and the baseplate to provide a resilient force for ejecting the pressing portion out of the through-hole.

In at least one embodiment, the jacket device may include a first enclosure portion and a second enclosure portion detachably connected with each other. The rocker bar, the change gear set, and/or the electric generator may be disposed on the sidewall and the baseplate of the first enclosure portion correspondingly.

In at least one embodiment, one of the first enclosure portion and the second enclosure portion may be provided with a slide rail, and the other may be provided with a slide groove that cooperates with the slide rail to provide relative sliding movement. The slide groove and the slide rail may be provided with corresponding engaging structures respectively to achieve the detachable connection between the first enclosure portion and the second enclosure portion.

In at least one embodiment, the through-hole and the locking portion may be disposed at two sides of the sidewall that are away from each other, and the jacket device may also include a cover plate that cooperates with the baseplate to form a sealed receiving chamber for completely receiving the change gear set and the electric generator.

In at least one embodiment, the jacket device may also include an electric power storage module. The electric power storage module is electrically connected with the electric generator.

In at least one embodiment, the electric power storage module may include a rechargeable battery or a capacitor. The jacket device may also include a battery charging chip, a switching diode, a voltage transforming circuit and a selecting switch. The battery charging chip may be disposed between the electric generator and the rechargeable battery. The switching diode may be disposed between the electric generator and the battery charging chip. The selecting switch may be disposed between the electric power storage module and the voltage transforming circuit.

In at least one embodiment, the electric generator is electrically connected with the electric power storage module and the voltage transforming circuit respectively. The jacket device may also include a rectifying circuit. The voltage transforming circuit may have an output electrically connected with a charging interface of the mobile communication apparatus and an input electrically connected with the electric generator and the electric power storage module respectively, and may be configured to carry out voltage transformation on the electric power from the electric generator or the electric power storage module. The rectifying circuit may have an input electrically connected with the electric generator and an output electrically connected with the input of the voltage transforming circuit and the electric power storage module respectively, and may be configured to rectify the electric power from the electric generator.

Certain embodiments of the present disclosure provide a mobile communication apparatus kit, which may include a mobile communication apparatus and any of the jacket devices described above. The mobile communication apparatus may be received in the receiving chamber. The kit may include at least one of each of the rocker bar, the change gear set and the electric generator. The mobile communication apparatus may include a charging interface. The electric power generated by the jacket device is used to charge the mobile communication apparatus via the charging interface. An outer side surface of the baseplate for the user to hold by hand may be an arc-shaped surface.

In at least one embodiment, the mobile communication apparatus may be a mobile phone or a palmtop computer. The jacket device may electrically connect with the charging interface via a USB charging plug, a 30-pin charging plug or an 8-pin charging plug, for example.

In at least one embodiment, the jacket device may be further provided with a USB interface for electrical connection with an external power source. The USB interface may be electrically connected with a voltage transforming circuit of the jacket device and the battery charging chip of the jacket device respectively so that the electric power storage module of the jacket device and the mobile communication apparatus can be charged by the external power source via the USB interface.

Embodiments of the present disclosure provide the following benefits: as compared to the prior art, the jacket device of the present disclosure may be provided with a rocker bar and an electric generator, so electric power can be generated by simply pressing the rocker bar to actuate the electric generator. As such, the technical problem in the prior art that the mobile communication apparatus cannot operate when the battery thereof runs out of power is effectively avoided. This can not only solve the problem caused when no charging power source is available for charging the mobile communication apparatus in time and no backup battery is available for use, but also provide a functional power source in emergencies, so the present disclosure has industrial applicability. Furthermore, apart from charging the mobile communication apparatus, the jacket device of the present disclosure can also improve the capabilities of the mobile communication apparatus against shocking, falling-off and scratching, so it can effectively protect the mobile communication apparatus. Moreover, integrating the protection function and the charging function together helps to reduce the production cost and facilitates popularization of the product.

Figure 1:
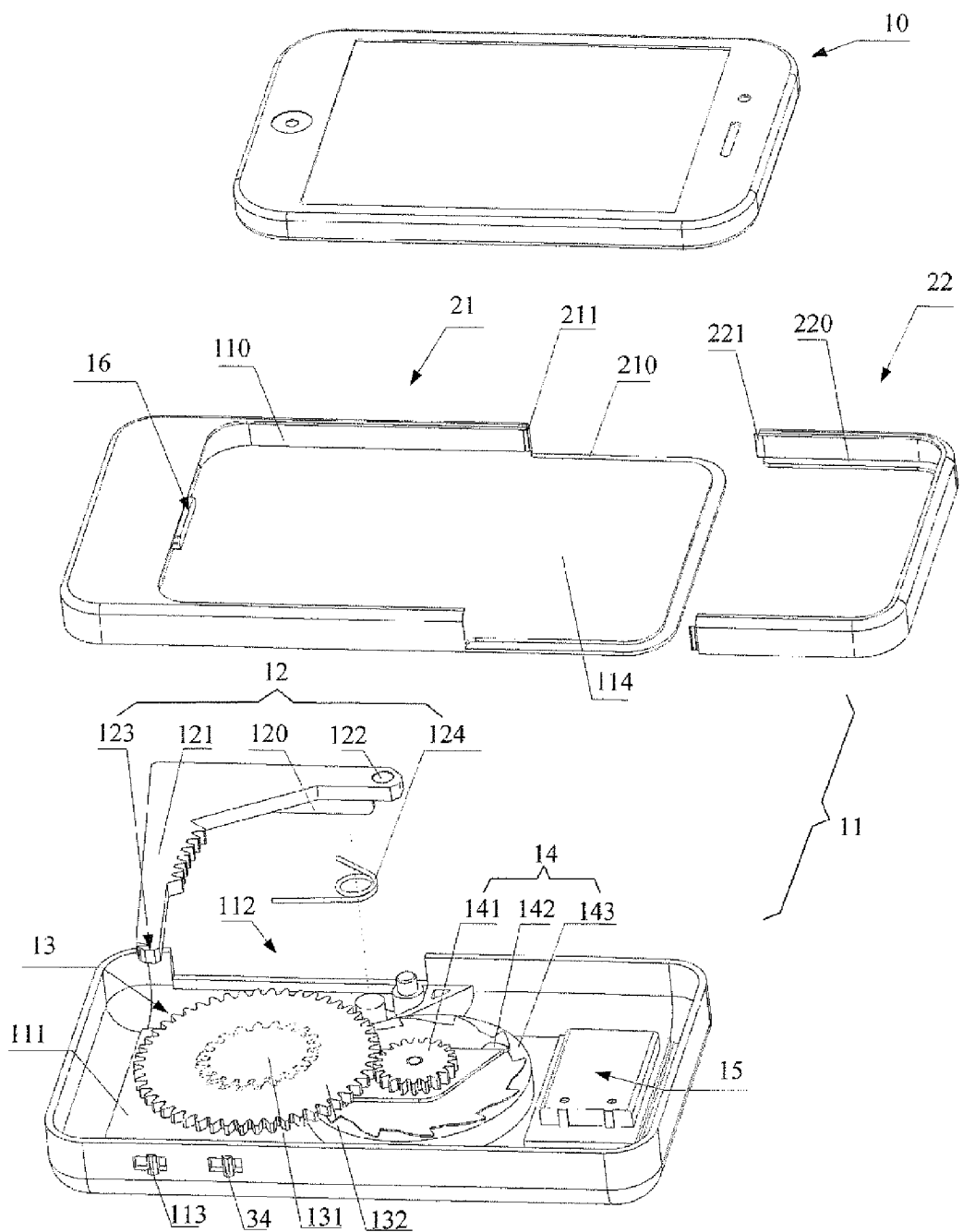
FIG. 1 illustrates a schematic structural view of an embodiment of the mobile communication apparatus kit according to the present disclosure, where a first gear and a portion of rack portion are shown in dashed lines.

Before the embodiments are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following description, for purpose of illustration rather than for limitation, specific details such as specific system structures, interfaces and technologies are set forth to provide a thorough understanding of this application. However, as will be appreciated by those skilled in the art, this disclosure may also be embodied in other forms without these specific details. In other cases, detailed descriptions of well-known devices, circuits and method are omitted for convenience description of this disclosure.

Referring to FIG. 1, there is shown a schematic structural view of an embodiment of a mobile communication apparatus kit according to the present disclosure. The mobile communication apparatus kit of this embodiment includes but is not limited to a mobile communication apparatus 10 and a jacket device 11.

In at least one embodiment, the mobile communication apparatus 10 may be a terminal with a communication function such as a mobile phone, a Personal Handy-phone System (PHS) device, a personal digital assistant (PDA) and an iPad, or a terminal such as a digital camera or a music player. This will be readily appreciated by those skilled in the art, and the above devices serve as examples only without limiting the scope of the present disclosure. Correspondingly, the mobile communication apparatus 10 of at least one embodiment includes a charging interface 100 (shown in FIG. 3) adapted to connect with a charging power source to charge the mobile communication apparatus 10. It shall be appreciated that, the charging interface 100 may be a USB charging interface, a 30-pin charging interface or an 8-pin charging interface, and can charge the mobile communication apparatus by connecting with a 220V or 110V external power source via a transformer or by connecting with a personal computer via a data cable. Further, it is also possible that both the charging function and the data transmission function can be achieved by the charging interface 100, which will be readily appreciated by those skilled in the art and, thus, will not be further described herein. Of course, in other embodiments, the mobile communication apparatus 10 may also include a display screen (whether it is the touch type or not), an earphone interface, a camera, a volume control key, an input keypad, a remote controller socket or the like.

The jacket device 11 includes a sidewall 110 and a baseplate 111 that cooperates with the sidewall 110 to form a receiving chamber for receiving the mobile communication apparatus 10 therein. The area of a window (not labeled) in the upper portion of the receiving chamber may be set depending on practical conditions, for example: if the input keypad of the mobile communication apparatus 10 is a physical keypad, then the window may only include a display screen area and a transparent soft plastic material may be used for the physical keypad area; and if the input keypad is a virtual keypad displayed on the display screen, then the window area may be disposed to have a maximized size along the sidewall 110 as long as the mobile communication apparatus 10 can be restricted within the receiving chamber.

In at least one embodiment, the jacket device 11 includes a rocker bar 12, a transmission 13 and an electric generator 14.

The rocker bar 12 includes a pressing portion 120 and a rack portion 121 connected with each other, with the rack portion 121 being disposed to extend through the sidewall 110. Specifically, the rocker bar 12 may be in the shape of a sickle, with the pressing portion 120 corresponding to a handle of the sickle and the rack portion 121 corresponding to a blade portion of the sickle.

It is worth noting that the rocker bar 12 shown in FIG. 1 is disposed to rotate about an axis by a predetermined angle. For example, to facilitate control of the pressing action, the predetermined angle formed between the pressing portion 120 and the sidewall 110 may range between 0° and 60°. Further, the rotation angle of the rocker bar 12 shall also match with the generation power of the electric generator 14. For example, if the generation power of the electric generator 14 is high and rotating the rocker bar 12 by only one turn can generate electric power sufficient to operate the mobile communication apparatus 10 for 10 to 20 seconds, then the predetermined angle may be decreased; but if the generation power of the electric generator 14 is low and rotating the rocker bar 12 by one turn is insufficient to operate the mobile communication apparatus 10 for 1 second, then the predetermined angle shall be increased to, for example, 80°. This will not be detailed herein. In other embodiments, the rocker 12 may also move linearly, in which case the rack portion 121 shall be set depending on the position of the change gear set 13 so that linear motion of the rack portion 121 will drive the change gear set 13 to rotate.

The transmission 13 is disposed on the baseplate 111 and connected with the rocker bar 12. Specifically, as shown in FIG. 1, the transmission 13 of this embodiment may be in the form of a change gear set disposed on the baseplate 111. The change gear set includes a first gear 131 and a second gear 132 arranged coaxially (FIG. 1 shows the structures of the first gear 131 and the rack portion 121 located below the second gear 132), and the first gear 131 engages with the rack portion 121. Obviously, the first gear 131 may be coupled with the second gear 132 via a third gear, a fourth gear, a fifth gear or more gears depending on the generation power of the electric generator or dynamo 14. For example, if the generation power of the dynamo 14 is low, then five or six gears, for example, may be provided for power transmission; and if the generation power of the electric generator 14 is high, then the first gear 131 and the second gear 132 may be used. To make the product lightweight and slim and practical for use, only the first gear 131 and the second gear 132 may be provided in at least one embodiment, and the first gear 131 and the second gear 132 may be coupled coaxially and fixedly. Both the number of teeth and the radius of the first gear 131 may be much smaller than those of the second gear 132. Further, in order to increase the generation power, the number of teeth of the first gear 131 that engage with the rack portion 121 may range between 4 and 10. For example, the rack portion 121 can drive the first gear 131 to rotate by a predetermined number of turns within one pressing cycle. Because the number of turns by which the first gear 131 rotates is the same as that of the second gear 132, the rotational speed of a gear that the second gear 132 engages with and drives may be much higher than that of the first gear 131.

Additionally, the first gear 131 may be coupled with the rack portion 121, and when the rack portion 121 moves towards the first gear 131 in response to the pressing action of the pressing portion 120, the teeth of the first rack portion 121 engage with the teeth of the first gear 131. After the rack portion 121 has moved to the furthest position, it will move back to the original position.

It shall be appreciated that the change gear set 13 illustrated is only provided as an illustrative example. As may be appreciated by those skilled in the art upon reviewing the disclosures of this application, other types of transmissions may also be used. For example, a pump and a swing rod may be used instead as long as movement of the rocker bar 12 can be transferred to the electric generator 14 to drive the electric generator 14, and such examples shall not be considered as limitations to the scope of the present disclosure.

It shall be appreciated that the rocker bar 12 may also be connected with a preset winding-up mechanism (not shown) in other embodiments. A user can press the rocker bar 12 to turn the winding-up mechanism into a compressed status. Then during a resetting process, the winding-up mechanism will drive the first gear 131 to rotate at a constant speed to transmit the power to the second gear 132 so that electric power can be generated at a stable voltage and a constant current. The detailed implementation will be readily appreciated by those skilled in the art and, thus, will not be further described herein.

The electric generator 14 is disposed on the baseplate 111, and includes a rotor (not shown) coupled with the transmission 13 and a stator (not shown) fixed on the baseplate 111. When the pressing portion 120 is pressed, the rack portion 121 drives, via the transmission 13, the rotor to rotate so that electric power is generated by the electric generator 14 to charge the mobile communication apparatus 10. Further, when a change gear set is used as the transmission 13, the rotor of the electric generator 14 includes a drive gear 141 coupled with the second gear 132. As described above, the first gear 131 and the second gear 132 may be connected with each other coaxially and fixedly in this embodiment, and both the number of teeth and the radius of the first gear 131 are much smaller than those of the second gear 132. In this case, by further setting the number of teeth and the radius of the drive gear 141 to be much smaller than those of the second gear 132, the drive gear 141 may be driven to rotate by dozens or hundreds of turns within one pressing cycle of the rocker bar 12, and this can effectively improve the power generation efficiency. Furthermore, if the rocker bar 12 is connected with a winding-up mechanism, then while a high power generation efficiency is obtained, the electric power generated by the electric generator 14 stays at a stable voltage and a constant current so that stable charging power can be obtained after the electric power is filtered.

Figure 2:
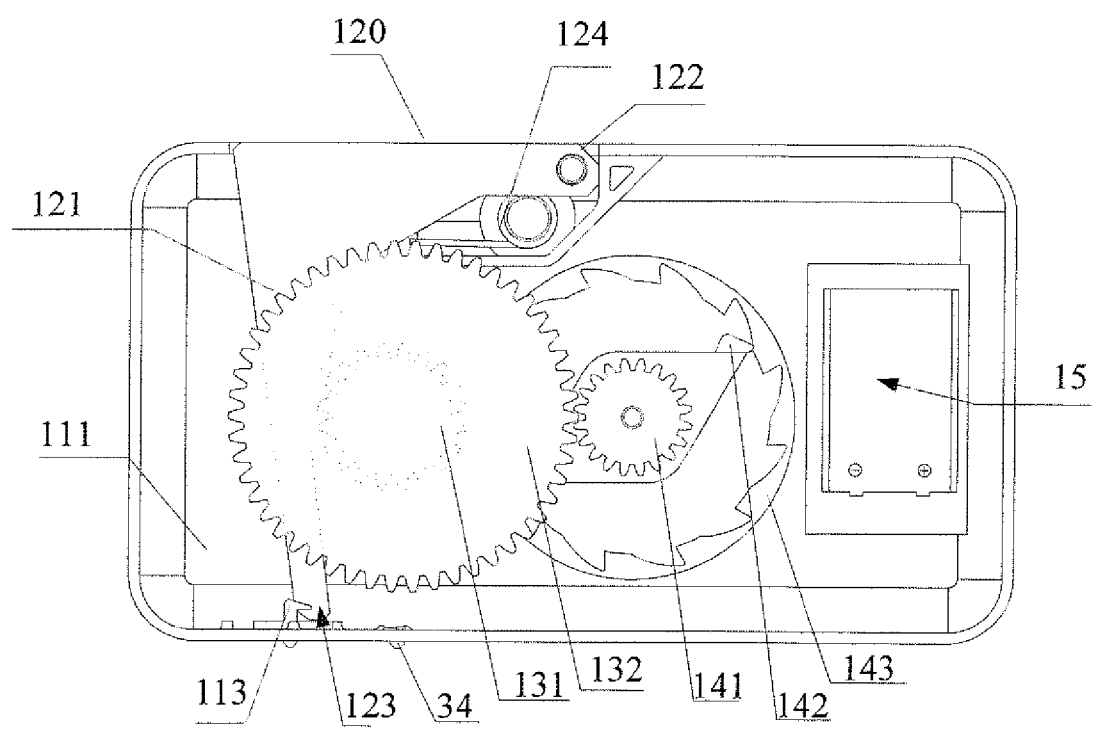
FIG. 2 illustrates a schematic structural view of an embodiment of the jacket device of the mobile communication apparatus kit shown in FIG. 1, where a first gear and a portion of rack portion are shown in dashed lines.

As shown in FIG. 2, in order to prevent the rack portion 121 from reciprocating to cause reversal rotation of the rotor of the electric generator 14, the electric generator 14 of this embodiment is further provided with a swing block 142 and an inner ratchet 143. The inner ratchet 143 is disposed coaxially with and connected with the rotor, and the swing block 142 engages with the inner ratchet 143 when rotating counter-clockwise and disengages from the inner ratchet 143 when rotating clockwise. In this way, the rotor of the electric generator 14 may be driven in one direction to generate electric power.

Additionally, the jacket device 11 may also be provided with a charging plug 16. The charging plug 16 may be in the form of a USB charging plug, a micro-USB connector, a 30-pin charging plug or an 8-pin charging plug, and the present disclosure is not limited thereto. Further, the number of each of the rocker bar 12, the change gear set 13 and the electric generator 14 is at least one in this embodiment, and the electric power generated by the electric generator 14 of the jacket device 11 can be used to charge the mobile communication apparatus 10 via the charging interface 100. Specifically, in this embodiment, it is also possible that another rocker bar may be disposed on the sidewall 110 at a position different from the position of the rocker bar 12 and another change gear set and another electric generator may be disposed on the baseplate 111. For example, the rocker bar 12 and the additional rocker bar may be disposed symmetrically, and when the user presses the rocker bar 12 and the additional rocker bar, electric power can be generated by both the electric generator 14 and the additional electric generator and, meanwhile, the gripping force of the user's hand may be exercised. This will add to the functions of the jacket device 11 and make the product environment-friendly and energy-saving. In order to prevent injury caused by the jacket device 11 to the user during the process of pressing the rocker bar(s), an outer side surface of the baseplate 111 for gripping by the user's hand may be formed as an arc-shaped surface, which may be designed in an ergonomic way.

When the pressing portion 120 is pressed during operation of the mobile communication apparatus kit, the rack portion 121 drives the first gear 131 to rotate and also drives the second gear 132 to rotate. Then, the second gear 132 drives the drive gear 141 to rotate and, in turn, the rotor is driven by the drive gear 141 to rotate so that electric power is generated by the electric generator 14 for charging. It shall be appreciated that, the electric power generated by the electric generator 14 may be directly used to charge the mobile communication apparatus 10 via the charging plug 16 plugged in the charging interface 100, or may be stored in a capacitor or a rechargeable battery disposed inside the jacket device 11. A selecting switch 34 (shown in FIGS. 1-3) is disposed between the electric power storage module 15 and the charging plug 16 so that the mobile communication apparatus 10 can be charged by turning on the selecting switch 34 if needed. Then, when the mobile communication apparatus 10 needs to be charged, the selecting switch 34 is switched on so that the electric power stored in the capacitor, a super capacitor, or the rechargeable battery charges the mobile communication apparatus 10 via the charging interface 100 connected with the charging plug 16. In this way, the user can press the rocker bar(s) to generate electric power in advance when he/she is idle so that the jacket device may be used as a "backup battery," and this makes the jacket device 11 of more practical use.

Figure 3:
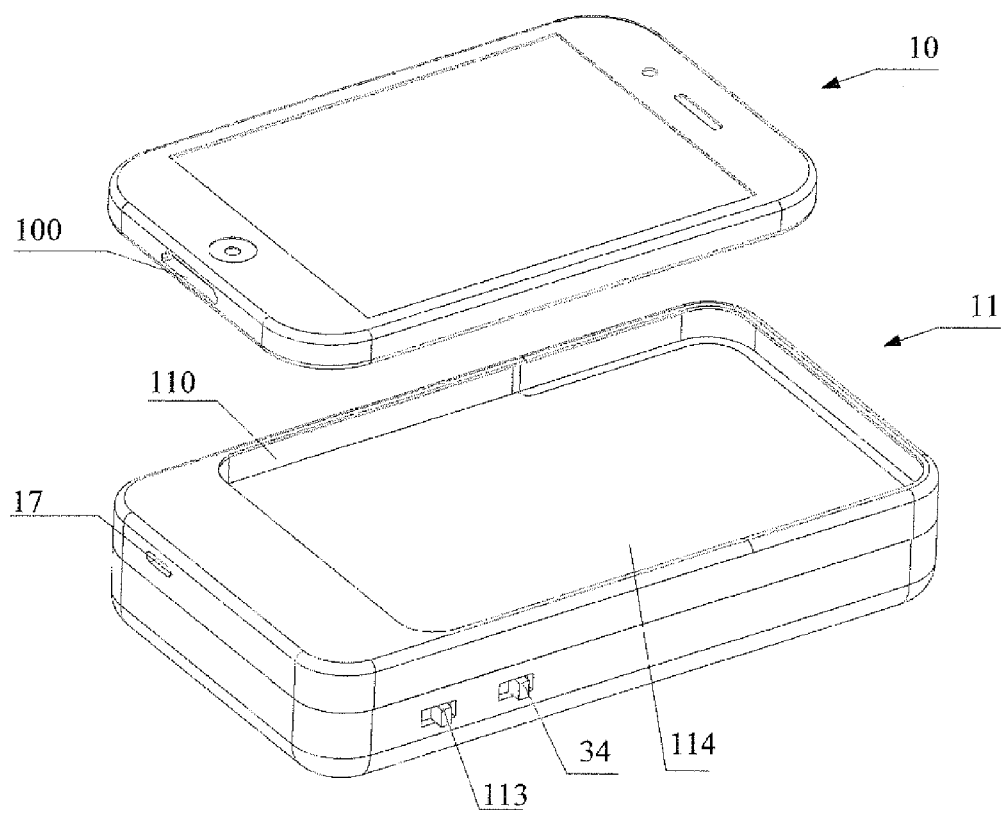
FIG. 3 illustrates a schematic assembled structural view of the mobile communication apparatus kit shown in FIG. 1.
Figure 4:
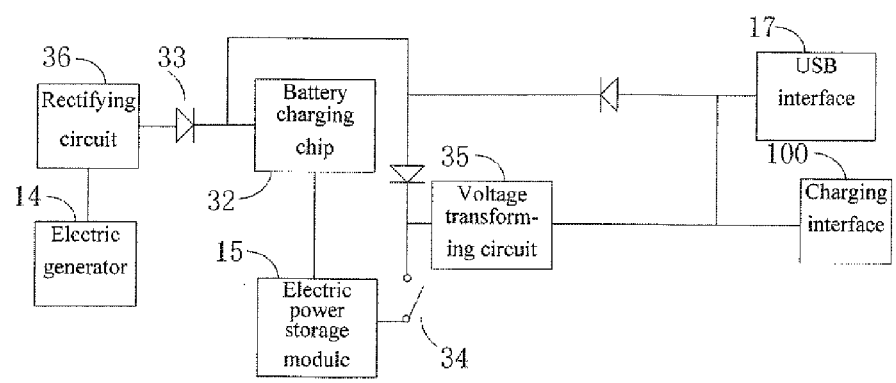
FIG. 4 illustrates a schematic view illustrating connections of an internal circuit of the mobile communication apparatus kit shown in FIG. 1.

Referring to FIGS. 2 to 4 together with FIG. 1, the present disclosure further provides a jacket device 11 for the aforesaid mobile communication apparatus kit. As described above, the jacket device 11 may include, but is not limited to, a sidewall 110, a baseplate 111, a rocker bar 12, a change gear set 13 and an electric generator 14.

Specifically, the sidewall 110 may be formed with a through-hole 112 and a locking portion 113. The jacket device 11 may also include a cover plate 114. As can be seen clearly, the through-hole 112 and the locking portion 113 may be disposed at two sides of the sidewall 110 that are away from each other, and the cover plate 114 maybe adapted to cooperate with the baseplate 111 to form a sealed receiving chamber so that, in use, the change gear set 13 and the electric generator 14 may be completely received in the receiving chamber to be spaced apart from the mobile communication apparatus 10.

The rocker bar 12 may also include a pivoting portion 122, a locking structure 123 and a resilient resetting element 124 connected with each other. The locking structure 123 may be disposed at an end of the rack portion 121 that is away from the pressing portion 120.

In at least one embodiment, the pivoting portion 122 may be located at an end of the pressing portion 120 that is away from the rack portion 121 and is used as a pivoting center.

The rack portion 121 may be disposed to extend through the through-hole 112 of the sidewall 110. For example, the through-hole 112 allows the rack portion 121 to reciprocate therethrough. The locking portion 113 and the locking structure 123 cooperate to fix the pressing portion 120 into the through-hole 112 in a non-operating status. In order to prevent the rocker bar 12 from interfering with the user's operation on the mobile communication apparatus 10 or from being impacted or being subjected to stress in the non-operating status (for example, a non-power-generating status), the rocker bar 12 may be hidden in the through-hole 112. Further, an outer side surface of the pressing portion 120 for the user to press may be flush with an outer side surface of the sidewall 110 with a smooth transition therebetween. It shall be appreciated that one of the locking portion 113 and the locking structure 123 may be a protrusion while the other may be a recess, or alternatively, the locking portion 113 and the locking structure 123 may be in the form of a buckle and a hook.

When the rack portion 121 moves to the furthest position, the locking structure 123 abuts against the locking portion 113 and then engages with the locking portion 113 to fix the rocker bar 12. The locking structure 123 may be a hook disposed on the rack portion 121, while the locking portion 113 may be a buckle disposed on the sidewall 110. In operation, automatic engagement may be accomplished by allowing the locking structure 123 to press the locking portion 113 in at least one embodiment; and in other embodiments, engagement and disengagement between the locking structure 123 and the locking portion 113 may also be achieved by manually pressing the locking portion 113 to move in two directions.

As shown in FIG. 2, the pivoting portion 122 is connected with the baseplate 111, and the resilient resetting element 124 is disposed between the pivoting portion 122 and the baseplate 111 to provide a resilient force for ejecting the pressing portion 120 out of the through-hole 112. The resilient resetting element 124 may be an extension spring, a spring, or the like as long as it can provide a resilient force sufficient to return the pressing portion 120 back to the original position after the rack portion 121 has moved to the predetermined furthest distance, and such examples shall not be considered as limitations to the scope of the present disclosure.

It is worth noting that the jacket device 11 may be made of a plastic material, wood, or an alloy material, for example. In order to ensure the strength of the jacket device 11 and make it lightweight and slim, the jacket device 11 may be made of a hard material. In this case, if the mobile communication apparatus 10 is forced into the window of the jacket device 11 in the conventional way during the process of inserting the mobile communication apparatus 10 into the jacket device 11, the jacket device 11 and the mobile communication apparatus 10 would be subjected to abrasion or scratch to some extent. In order to avoid this problem, the jacket device 11 may include a first enclosure portion 21 and a second enclosure portion 22 detachably connected with each other, as shown in FIG. 2. The first enclosure 21 has an area and a volume both larger (for example, accounts for a large proportion in the receiving chamber) than those of the second enclosure portion 22. The rocker bar 12, the change gear set 13, and/or the electric generator 14 are correspondingly disposed on the sidewall 110 and the baseplate 111 of the first enclosure portion 21. For example, the rocker bar 12, the change gear set 13 and the electric generator 14 may all be disposed on the sidewall 110 and the baseplate 111 of the first enclosure portion 21; or one of the rocker bar 12, the change gear set 13 and the electric generator 14 may be disposed on the sidewall 110 and the baseplate 111 of the first enclosure portion 21 while the other two are disposed on the second enclosure portion 22. Alternatively, two of the rocker bar 12, the change gear set 13 and the electric generator 14 may be disposed on the sidewall 110 and the baseplate 111 of the first enclosure portion 21 while the remaining one is disposed on the second enclosure portion 22, and such examples shall not be considered as limitations to the scope of the present disclosure.

One of the first enclosure portion 21 and the second enclosure portion 22 may be provided with a slide rail, and the other may be provided with a slide groove that cooperates with the slide rail to provide relative sliding movement. The slide groove and the slide rail may be provided with corresponding engaging structures respectively to secure the connection between the first enclosure portion 21 and the second enclosure portion 22 in use. In at least one embodiment, the first enclosure portion 21 may be provided with a slide rail 210 and a first engaging structure 211, and the second enclosure portion 22 may be provided with a slide groove 220 and a second engaging structure 221. The slide rail 210 may be a sheet-like structure or in a "convex" configuration, and the slide groove 220 may be a groove structure and preferably in a "concave" configuration. One of the first engaging structure 211 and the second engaging structure 221 may be a tab while the other is a positioning slot. In use, the slide rail 210 can reciprocate within the slide groove 220, and through engagement between the first engaging structure 211 and the second engaging structure 221, the detachable connection between the first enclosure portion 21 and the second enclosure portion 22 can be achieved.

In at least one embodiment, the first enclosure portion 21 and the second enclosure portion 22 may also rotate relatively to each other about the location of the first engaging structure 211 and the second engaging structure 221, for example, connect with each other in a clamshell manner. The way in which the first enclosure portion 21 and the second enclosure portion 22 connect with each other is not limited herein so long as the mobile communication apparatus 10 can be placed in the jacket device 11 without damage.

It is worth noting that the baseplate 111 and the sidewall 110 may be detachably connected with each other. Specifically, the rocker bar 12, the change gear set 13, and the electric generator 14 may be disposed on the baseplate 111. The sidewall 110 may be fixedly connected with the cover plate 114, and the baseplate 111 and the sidewall 110 may be connected through the use of screws or the like.

When the pressing portion 120 is pressed during operation of the jacket device 11, the rack portion 121 drives the first gear 131 to rotate and also drives the second gear 132 to rotate. Then, the second gear 132 drives the drive gear 141 to rotate and, in turn, the rotor is driven by the drive gear 141 to rotate so that electric power is generated by the electric generator 14 for charging. It shall be appreciated that the electric power generated by the electric generator 14 may be directly used to charge the mobile communication apparatus 10 via the charging plug 16 plugged in the charging interface 100, or may be stored in a capacitor or a rechargeable battery disposed inside the jacket device 11. Then when the mobile communication apparatus 10 needs to be charged, a predetermined selecting switch may be switched on so that the electric power stored in the capacitor or the rechargeable battery charges the mobile communication apparatus 10 via the charging interface 100 connected with the charging plug 16. In this way, the user can press the rocker bar(s) to generate electric power in advance when he/she is idle so that the jacket device is used as a "backup battery", and this makes the jacket device 11 of more practical use.

Referring to FIG. 4 together with FIGS. 1-3, an internal circuit of the jacket device 11 may include, but is not limited to, an electric power storage module 15. The electric power storage module 15 may be electrically connected with the electric generator 14.

The electric power storage module 15 may be implemented as a rechargeable battery or a capacitor. The electric power storage module 15 may be implemented as a rechargeable battery, and in this case, the jacket device 11 may include a battery charging chip 32 disposed between the electric generator 14 and the rechargeable battery. The battery charging chip 32 monitors the charge state of the electric power storage module 15 while charging.

Furthermore, to prevent electric current generated by the electric generator 14 from flowing back into the electric generator 14, the jacket device 11 may be further provided with a switching diode 33 disposed between the electric generator 14 and the battery charging chip 32. In at least one embodiment, the switching diode 33 may also be disposed between the electric power storage module 15 and the battery charging chip 32 and such examples shall not be considered as limitations to the scope of the present disclosure.

As described above, the jacket device 11 may be provided with a selecting switch 34, a voltage transforming circuit 35 and a rectifying circuit 36. The selecting switch 34 may be disposed between the electric power storage module 15 and the voltage transforming circuit 35 so that the mobile communication apparatus 10 can be charged by turning on the selecting switch 34 if needed.

In FIG. 4, the electric generator 14 is electrically connected with the electric power storage module 15 and the voltage transforming circuit 35. The voltage transforming circuit 35 has an output electrically connected with the charging interface 100 and an input electrically connected with the electric generator 14 and the electric power storage module 15 respectively, and is configured to carry out voltage transformation on the electric power from the electric generator 14 or the electric power storage module 15. For example, the voltage transforming circuit 35 may be configured to transform a voltage of 1 V or 2V or 3.7 V from the electric generator 14 or the electric power storage module 15 into a normal service voltage of 5V for the mobile communication apparatus 10, and such examples shall not be considered as limitations to the scope of the present disclosure.

The rectifying circuit 36 has an input electrically connected with the electric generator 14 and an output electrically connected with the input of the voltage transforming circuit 35 and the electric power storage module 15 respectively, and is configured to rectify the electric power from the electric generator 14. An alternating current generated by the electric generator 14 may be rectified into a direct current by the rectifying circuit 36 to charge the mobile communication apparatus 10 or the electric power storage module 15.

As described above, the voltage transforming circuit 35 of the jacket device 11 may be electrically connected with the charging interface 100 via a USB charging plug, a 30-pin charging plug or an 8-pin charging plug of the charging plug 16. The jacket device 11 may be further provided with a USB interface 17 for electrical connection with an external power source. The USB interface 17 is electrically connected with the voltage transforming circuit 35 and the battery charging chip 32 of the jacket device 11 respectively so that the electric power storage module 15 of the jacket device 11 and the mobile communication apparatus 10 can be charged by the external power source via the USB interface 17. Of course, in other embodiments, some other external apparatus may also be charged by the electric power output from the voltage transforming circuit 35 via the USB interface 17.

It shall be appreciated that the jacket device 11 may also be provided with an overcurrent protection circuit, an over-voltage protection circuit, a filtering circuit or the like. This can prevent related components from being burned out when both the electric power storage module 15 and the mobile communication apparatus 10 are charged simultaneously by an external charging power source via the USB interface 17, and can provide stable voltage and current output through a related filtering circuit.

The mobile communication apparatus kit of the present disclosure may be provided with a rocker bar 12 and an electric generator 14 on the jacket device 11, so electric power can be generated by simply pressing the rocker bar 12 to actuate the electric generator 14. Thereby, the technical problem that the mobile communication apparatus 10 cannot operate when the battery thereof runs out of power is effectively avoided. This can not only solve the problem caused when no charging power source is available for charging the mobile communication apparatus in time and no backup battery is available for use, but also provide a backup function in emergencies. Furthermore, apart from charging the mobile communication apparatus 10, the jacket device 11 of the present disclosure can also improve the capabilities of the mobile communication apparatus 10 against shocking, falloff and scratching, so it can effectively protect the mobile communication apparatus 10. Moreover, integrating the protection function and the charging function together helps to reduce the production cost and facilitates popularization of the product.

Electric power can be generated by simply pressing the rocker bar 12, and the electric power generated within a short time period (for example, within one or two minutes) is sufficient to keep the mobile communication apparatus 10 operating for a certain time period (for example, five to ten minutes). In case conventional power sources cannot work normally in emergencies (for example, such disasters as earthquakes, snowstorms or hurricanes), the electric power generated by the electric generator may be used to activate the mobile communication apparatus 10 to send a distress signal (for example, a message or a phone call) to the rescuer. Additionally, the user can press the rocker bar 12 at any time to generate electric power and store the generated electric power into the electric power storage module 15 (for example, a rechargeable battery) of the jacket device 11. Then, when the mobile communication apparatus 10 runs out of power and needs to be charged, the selecting switch 34 may be switched on to charge the mobile communication apparatus 10 in time. This can further satisfy the urgent need for electric power in emergencies.

As described above, in the operating status, the pressing portion 120 of the rocker bar 12 of the present disclosure protrudes out of the through-hole 112 for the user to press. However, in the no-operating status, the pressing portion 120 is fixed into the through-hole 112 by the locking portion 113 and the locking structure 123 cooperating with each other, and this makes the jacket device 11 aesthetic in appearance and can prevent damage of the rocker bar 12 due to impact or other reasons. Further, when the pressing portion 120 is fixed into the through-hole 112 through engagement between the locking portion 113 and the locking structure 123, an outer side surface of the pressing portion 120 for the user to press is flush with an outer side surface of the sidewall 110 with a smooth transition therebetween. As such, scratching or scoring injury to the user by corners of the rocker bar 12 can be avoided during use of the mobile communication apparatus, so it has the practical applicability.

It is worth noting that the power generation structures including the rack portion 121, the transmission 13, and the electric generator 14 disposed in the jacket device 11 of the present disclosure occupy a space in the receiving chamber that may be no greater than three quarters of the total space of the receiving chamber. For example, when the jacket device 11 is used with the mobile communication apparatus 10 in the mobile communication apparatus kit, an overall height of the power generation structures including the rack portion 121, the transmission 13, and the electric generator 14 may be about a half to three quarters of the height of the receiving chamber; and a height of the mobile communication apparatus 10 may be about one quarter to a half of the height of the receiving chamber. In other words, the overall height of the jacket device 11 may vary slightly from that of a conventional jacket device, and has no influence on the user's experience in use.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A jacket device configured to be used with a mobile communication device, the jacket device comprising:
   a sidewall and a baseplate, wherein the sidewall and the baseplate cooperate to form a receiving chamber for receiving the mobile communication device;
   a rocker bar including a pressing portion connected to a rack portion, wherein the rack portion extends through the sidewall;
   a transmission disposed on the baseplate and connected with the rocker bar; and
   an electric generator disposed on the baseplate, wherein the electric generator includes a rotor coupled with the transmission and a stator fixed on the baseplate, wherein when the pressing portion is pressed, the rack portion drives the rotor to rotate via the transmission so that electric power is generated by the electric generator.

2. The jacket device of claim 1, wherein the transmission comprises a change gear set including a first gear and a second gear arranged coaxially, wherein the first gear engages the rack portion, and the rotor of the electric generator includes a drive gear coupled with the second gear.

3. The jacket device of claim 1, wherein the sidewall is formed with a through-hole and a locking portion, wherein the through-hole is adapted to allow the rack portion to reciprocate therethrough, wherein the rocker bar is further provided with a locking structure, and wherein the locking portion and the locking structure cooperate to fix the pressing portion into the through-hole in a non-operating status.

4. The jacket device of claim 3, wherein an outer side surface of the pressing portion that is to be pressed by a user is flush with an outer side surface of the sidewall with a smooth transition therebetween.

5. The jacket device of claim 4, wherein the rocker bar further comprises a pivoting portion and a resilient resetting element, wherein the pivoting portion is connected with the baseplate, and wherein the resilient resetting element is disposed between the pivoting portion and the baseplate to provide a resilient force for ejecting the pressing portion out of the through-hole.

6. The jacket device of claim 4, wherein the jacket device further comprises a first enclosure portion detachably connected to a second enclosure portion, and wherein one or more of the rocker bar, the change gear set or the electric generator are disposed on one or both of the sidewall or the baseplate.

7. The jacket device of claim 6, wherein one of the first enclosure portion and the second enclosure portion is provided with a slide rail, and the other one of the first enclosure portion and the second enclose portion is provided with a slide groove that cooperates with the slide rail to provide a relative sliding movement, and wherein the slide groove and the slide rail include corresponding engaging structures configured to achieve the detachable connection between the first enclosure portion and the second enclosure portion.

8. The jacket device of claim 3, wherein the through-hole and the locking portion are disposed at two sides of the sidewall that are distally located from each other, and the jacket device further comprises a cover plate that cooperates with the baseplate to form a receiving chamber for receiving the change gear set and the electric generator.

9. The jacket device of claim 1, further comprising an electric power storage module electrically connected with the electric generator.

10. The jacket device of claim 9, wherein the electric power storage module comprises a rechargeable battery or a capacitor, and wherein the jacket device further includes:
    a battery charging chip disposed between the electric generator and the rechargeable battery;
    a switching diode disposed between the electric generator and the battery charging chip; and
    a voltage transforming circuit and a selecting switch, wherein the selecting switch is disposed between the electric power storage module and the voltage transforming circuit.

11. The jacket device of claim 10, wherein the electric generator is electrically connected with the electric power storage module and the voltage transforming circuit, wherein the voltage transforming circuit includes an output electrically connected with a charging interface of the mobile communication device and an input electrically connected with the electric generator and the electric power storage module, and wherein the voltage transforming circuit is configured to carry out voltage transformation on the electric power from the electric generator or the electric power storage module, and the jacket device further includes:
    a rectifying circuit having an input electrically connected with the electric generator and an output electrically connected with the input of the voltage transforming circuit and the electric power storage module, and wherein the rectifying circuit is configured to rectify the electric power from the electric generator.

12. A mobile communication apparatus kit, comprising:
    a mobile communication apparatus including a charging interface; and
    a jacket device including a receiving chamber,
    wherein the mobile communication apparatus is received in the receiving chamber, wherein electric power generated by the jacket device is used to charge the mobile communication apparatus via the charging interface, wherein the jacket device comprises:
    a sidewall and a baseplate, wherein the sidewall and the baseplate cooperate to form the receiving chamber for receiving the mobile communication apparatus;
    a rocker bar including a pressing portion connected to a rack portion, wherein the rack portion extends through the sidewall;
    a transmission disposed on the baseplate and connected with the rocker bar; and an electric generator disposed on the baseplate, wherein the electric generator includes a rotor coupled with the transmission and a stator fixed on the baseplate, wherein when the pressing portion is pressed, the rack portion drives the rotor to rotate via the transmission so that electric power is generated by the electric generator.

13. The mobile communication apparatus kit of claim 12, wherein the mobile communication apparatus includes a mobile phone or a computer, and the jacket device is electrically connected with the charging interface via a USB charging plug, a 30-pin charging plug or an 8-pin charging plug.

14. The mobile communication apparatus kit of claim 12, wherein the jacket device is further provided with a USB interface for electrical connection with an external power source, and the USB interface is electrically connected with a voltage transforming circuit of the jacket device and a battery charging chip of the jacket device respectively so that an electric power storage module of the jacket device and the mobile communication apparatus can be charged by the external power source via the USB interface.

15. A mobile communication apparatus kit, comprising:
   a mobile communication apparatus including a charging interface; and
   a jacket device including a receiving chamber,
   wherein the mobile communication apparatus is received in the receiving chamber, wherein electric power generated by the jacket device is used to charge the mobile communication apparatus via the charging interface, wherein the jacket device is further provided with a USB interface for electrical connection with an external power source, and the USB interface is electrically connected with a voltage transforming circuit of the jacket device and a battery charging chip of the jacket device respectively so that an electric power storage module of the jacket device and the mobile communication apparatus can be charged by the external power source via the USB interface.

16. The mobile communication apparatus kit of claim 15, wherein the jacket device comprises:
   a sidewall and a baseplate, wherein the sidewall and the baseplate cooperate to form the receiving chamber for receiving the mobile communication apparatus;
   a rocker bar including a pressing portion connected to a rack portion, wherein the rack portion extends through the sidewall;
   a transmission disposed on the baseplate and connected with the rocker bar; and
   an electric generator disposed on the baseplate, wherein the electric generator includes a rotor coupled with the transmission and a stator fixed on the baseplate, wherein when the pressing portion is pressed, the rack portion drives the rotor to rotate via the transmission so that electric power is generated by the electric generator.

\* \* \* \* \*